United States Patent
Gurevich

(10) Patent No.: US 7,243,618 B2
(45) Date of Patent: Jul. 17, 2007

(54) STEAM GENERATOR WITH HYBRID CIRCULATION

(76) Inventor: Arkadiy M. Gurevich, 9306 Justine Ct., Louisville, KY (US) 40299

( * ) Notice: Subject to any disclaimer, the term of this patent is extended or adjusted under 35 U.S.C. 154(b) by 0 days.

(21) Appl. No.: 11/249,998

(22) Filed: Oct. 13, 2005

(65) Prior Publication Data
US 2007/0084418 A1    Apr. 19, 2007

(51) Int. Cl.
*F22D 1/00*  (2006.01)
(52) U.S. Cl. .................. 122/7 R; 122/406.1; 122/415
(58) Field of Classification Search ............... 122/414, 122/7 R, 415, 406.4, 409, 448.3, 448.4, 461, 122/469, 479.7, 479.4
See application file for complete search history.

(56) References Cited

U.S. PATENT DOCUMENTS

| 4,858,562 | A | * | 8/1989 | Arakawa et al. ............ 122/7 R |
| 5,419,285 | A | * | 5/1995 | Gurevich et al. ......... 122/406.1 |
| 5,588,400 | A | * | 12/1996 | Stefan et al. ............ 122/406.1 |
| 5,762,031 | A | | 6/1998 | Gurevich |
| 6,055,803 | A | | 5/2000 | Mastronarde |
| 6,092,490 | A | | 7/2000 | Bairley et al. |
| 6,173,679 | B1 | * | 1/2001 | Bruckner et al. ........ 122/406.4 |
| 6,189,491 | B1 | | 2/2001 | Wittchow et al. |
| 6,557,500 | B1 | * | 5/2003 | Schroeder ................... 122/7 R |
| 2001/0025609 | A1 | * | 10/2001 | Liebig ..................... 122/406.1 |

FOREIGN PATENT DOCUMENTS

| FR | 1274240 | 10/1961 |
| JP | 03 221702 | 9/1991 |
| JP | 05 086900 | 4/1993 |

* cited by examiner

*Primary Examiner*—Gregory Wilson
(74) *Attorney, Agent, or Firm*—Camoriano and Associates; Theresa Fritz Camoriano; Guillermo Camoriano

(57) ABSTRACT

A hybrid vapor generator has at least one evaporator with tubes arranged in sections, one section including a natural circulation loop with a separating drum and downcomer(s), and another section being a pump assisted once-through circulation section.

18 Claims, 3 Drawing Sheets

STEAM GENERATOR WITH HYBRID CIRCULATION

BACKGROUND

This application claims priority from U.S. Provisional Patent Application Ser. No. 60/533,510, filed Jan. 2, 2004 and from PCT Application PCT/US2004/042778, filed Dec. 17, 2004. The invention relates to vapor generators (boilers) of subcritical pressure, which may serve as heat recovery steam generators (HRSG) providing enhanced cycling capacity and high base-load efficiency for combined cycle or cogeneration power plants. These vapor generators also may find application in other environments, such as regular boilers, boilers used in coal gasification power plants, and so forth. In the HRSG situation, the vapor generators may utilize the heat content of the power plant gas turbine exhaust and/or combustion process for generating live steam and may employ this steam either as a motive fluid for a steam turbine or for process purposes. Presently, the most widely used HRSGs are those with a horizontal mode of construction and vertical heated tubes.

The principles of the present invention will be described mostly by reference to this type of HRSG for the sake of convenience; however, this is not intended to limit the scope of the claims.

Two basic types of steam generators are known, those with and without a separating drum. Drum-type boilers operate either by natural circulation without circulation pumps, or by forced circulation, usually involving circulation pumps. In the case of natural or forced circulation in a drum-type boiler, the circulating water supplied to the boiler evaporator is only partly evaporated when passing through its heated tubes. After separation of the generated steam in the steam drum, the water that is not evaporated is fed again, or recirculated, to the same heated tubes for further evaporation. Drum-type boilers are applicable only for subcritical pressure (<220 bara).

Boilers without separation drums are applicable both for sub- and supercritical pressures. They utilize the once-through concept. Evaporation and steam superheat of the working fluid takes place in the boiler heated tubes without intermediate steam separation and water recirculation. These boilers have the advantage that they do not require a heavy and expensive drum, making them more suitable for fast start-ups and cycling operation with many load changes. However, once-through boilers are not widely used in the HRSG industry, due to their many disadvantages, which are described below.

The traditional drum-type boilers put severe restrictions on the ability to start up the gas turbines quickly; in a typical installation, while the gas turbine itself could start up in approximately twenty minutes, the time required to gradually heat up the drum of the boiler is up to two hours, which delays the full load operation of the gas turbine. This results in a loss of the opportunity to supply power to the grid at times of peak demand, when energy prices are high. Start-up is also a time when the rate of emissions is up to ten times the level during normal operation, and the efficiency of gas turbine power generation is substantially reduced. Thus, there is a market demand for an efficient heat recovery steam generator (HRSG) that would allow quick gas turbine start-up and load ramp rate. One proposed solution is a once-through boiler with a horizontal mode of construction and vertical heated tubes, as described in U.S. Pat. No. 6,189,491 entitled "Steam Generator". According to this patent, the heating surface of the boiler is "configured in such a way that the fluid circulating in a tube heated to a greater temperature than the following tube of the same continuous heating surface has a higher flow rate than the fluid circulating in the following tube".

The benefits of using the once-through concept in boiler evaporators with vertical heated tubes have been generally understood for some time. A comprehensive consideration of the thermal and hydraulic principles incorporated in the above mentioned U.S. Pat. No. 6,189,491 can be found in "Steam Boilers of thermal Power Stations" by U. S. Reznikov and Yu. M. Lipov (Mir Publishers, Moscow, 1985, English Translation, pages 135 & 136, FIG. 11.18). This textbook and U.S. Pat. No. 6,189,491 both describe once-through steam generators comprised of analogous components: the entry and discharge collectors; a heating-gas duct; a once-through heating area disposed in the heating-gas duct; the once-through heating area formed from a number of vertically disposed steam-generator tubes connected in parallel between the collectors for a through flow of a working fluid.

It should be noted that the mechanism of interaction between the heat transfer and the features of circulation disclosed in U.S. Pat. No. 6,189,491 is also similar to that found in the least heated evaporator multiple row modules of conventional HRSG with vertical heated tubes and natural circulation. Indeed, due to very low working fluid velocities (sometimes, a small fraction of one m/s), the friction pressure losses in the parallel heated tubes of those modules, even at a full boiler load, are especially low compared with the geodetic pressure drop in the vertical tubes. This makes the mechanism of flow distribution between the heated evaporator tubes of multiple row modules very similar to that found in the patented technology. The references to the book by U. S. Reznikov and Yu. M. Lipov, as well as to the least heated tube modules of conventional HRSGs with natural circulation, are incorporated herein for the purposes of describing the background of this application.

Disadvantages of conventional drum boilers: Thick-walled and heavy steam drums of conventional HRSGs significantly limit their cycling capacity and increase the boiler cost. The undisputed advantage of once-through HRSG with vertical heated tubes, as compared to conventional HRSG with vertical tubes and natural circulation, is that it has no steam drum. This adds to the boiler cycling capacity and provides unrestricted start-up and load ramp rate for the gas turbine.

The drum-type boilers of the prior art have another well-known problem. At high subcritical pressure (close to 170-190 bara) and/or when there are restrictions to the length of their heated vertical tubes, there emerge serious difficulties in providing reliable natural circulation based on the traditional design approaches. Under such conditions, the evaporator heated tubes and the piping system become more complicated and expensive. A number of known risks, such as critical heat flux, circulation stagnation, circulation reversal, etc., sometimes prevent the realization of significant and long-appreciated benefits of natural circulation.

Disadvantages of once-through boilers: The once-through boiler described in the '491 patent has several disadvantages.

(1) Due to low working fluid velocities, it requires a larger evaporator heating surface than a conventional boiler with natural circulation.

(2) It employs a complex piping system for the transportation and distribution of the steam/water mixture in-between the evaporator sections.

(3) Its start-up/shut-down procedure and equipment are more complicated than that of conventional HRSG with natural circulation.

(4) Special throttle/choke devices and/or design approaches (for example, the use of evaporator heated tubes with different inside diameters, as claimed in the U.S. Pat. No. 6,189,491) sometimes are needed for working fluid stability, etc.

(5) In addition to information disclosed in the U.S. patent, there is still a need for research and development work (both experimental and theoretical) dedicated to the interconnected subjects of steam/water mixture distribution, intertube flow pulsations and boiler feedwater flow variations. These negative aspects are of practical importance and likely to be encountered in the once-through boiler of the type described in the '491 patent.

SUMMARY

One embodiment of the present invention, as described herein, provides a cost effective heat recovery steam generator with enhanced cyclic capacity, enabling unrestricted start-up and load ramp rates for gas turbines used in a high efficiency combined cycle/cogeneration power plant.

It also provides a steam generator suitable for vertical or horizontal arrangement of heated tubes, combining the advantages of once-through boilers and of drum type natural circulation boilers without the restrictions to cyclic operation that are traditionally imposed by conventional high pressure drum-type boilers.

It also permits the use of a start-up procedure and equipment similar to that of conventional drum-type HRSG with natural circulation, without the need for special separators and water storage vessels traditionally used in conventional once-through utility boilers.

It also provides a high subcritical pressure steam generator with the live steam temperature controlled at any operating load as well as during the plant start-up, without the application of an inter-stage steam attemperator.

It also provides a steam generator with self-controlled distribution of working fluid between the evaporator vertical heated tubes in proportion to the amount of heat supplied to the tubes, without the downward flow of steam/water mixture and without a special steam/water mixture distribution system.

It achieves flow stability and low pressure loss in parallel vertical evaporator tubes and provides a stable feedwater supply to the boiler at any operating loads and during the plant start-up, without the application of stabilizing throttle/choke devices.

It also provides an independent water supply to the evaporator once-through and natural circulation sections, providing for reliable and efficient operation of those sections.

It can be designed on the basis of conventional design tools and approaches and can be manufactured out of traditional materials, with especially simple means and at low production and assembly cost.

The embodiment shown herein uses an evaporator with at least two sections operating at the same pressure, one being a natural circulation section, and another being a pump assisted, once-through section.

The embodiment described herein provides for an improved steam generator with an economizer, evaporator, and superheater. The evaporator comprises parallel-connected heated tubes split between at least two independent evaporator sections at the same outlet pressure, one of which employs once-through circulation, and the other of which employs natural circulation of the working fluid. The total boiler steam production becomes equal to the sum of two components: one is the slightly superheated steam generated in the once-through system; the second—saturated steam generated in the natural circulation loop. Due to the decreased steam production in the natural circulation loop of this hybrid boiler, the size (diameter) and, hence, the shell thickness of its steam drum can be significantly reduced. As a result, the thermal and mechanical stresses operationally induced in the drum shell can be sufficiently minimized to allow enhancement of the boiler cyclic capacity. By proper sharing of heated tubes and, hence, by sharing the total steam production between the once-through and natural circulation sections of the evaporator, it becomes possible to substantially reduce the drum diameter and shell thickness from those of traditional drum-type boilers, so the resulting boiler can function efficiently in cycling situations, including start-up.

The combination of once-through and natural circulation in the boiler evaporator does not negatively influence the power plant efficiency, as it does not impose any additional limitations on the boiler steam parameters and flow, outlet gas temperature, pressure drops, etc. This combination can be used in boilers with different modes of construction—horizontal, vertical, etc.

In application to HRSG with vertical tubes, there is a single once-through section in the evaporator, where the transition from the liquid to the slightly superheated steam takes place in just one pass, without water recirculation or steam separation. The parallel-connected heated tubes of this section, as well as the heated tubes of the natural circulation section, provide for upward flow of the working fluid. The only evaporator pipe(s) with a downward direction of water flow is/are the downcomer(s) connecting the steam drum with the heated tube inlets of the natural circulation section. As a result, the boiler does not require a special system for transportation of the steam/water mixture and/or its distribution between the evaporator sections. The upward direction of the steam/water mixture flow, along with the continuous steam temperature control at the inlet of the novel boiler superheater, which is slightly higher than the saturation temperature, also allows the elimination of the ancillary equipment usually required for the start-up and operation of the conventional once-through boiler, such as separator, water storage vessel, valves, piping, gages, etc. As a result, the procedure and equipment for boiler start-up/shut-down are practically identical to those in conventional boilers with natural circulation. This simplifies the boiler construction and operation. Another obvious advantage, provided by a single pass once-through evaporator section, is the reduction in pressure loss, which translates into reduced feed pump power consumption.

Furthermore, potentially serious problems for the conventional once-through boilers as well as for the steam generator described in U.S. Pat. No. 6,189,491 are:

1) flow variations in evaporator parallel heated tubes (e.g. the "intertube" flow variations out of phase with feedwater supply) and 2) feedwater flow operational instability.

In the boiler embodiment described herein, these problems are eliminated by:

1) the geodetic driving force of circulation in a single pass once-through evaporator section with only upward direction of the working fluid and 2) the increased amount of boiling water in the heated tubes, piping and steam drum of the natural circulation loop, as compared with that in the conventional once-through heating surface. No special throttle/choke devices or controls are required for these purposes.

Still another feature of the embodiment described herein is that it can run at any steady state and transient loads as well as during start-ups, without an inter-stage steam attemperator. This becomes practical, because the live steam temperature is controlled by appropriate feedwater supply to the once-through evaporator section of the boiler, which should be consistent with the heat supplied to its heating surface. In an HRSG application, the once-through section is able to produce up to 95% of the total steam production. Another contributing factor here is the comparative ease of this control as a result of the reduced response lag of this signal temperature to the proper change in feedwater supply to the once-through section.

All the foregoing features translate directly into HRSG lower capital and operating costs, reduced maintenance, and increased reliability and availability. As mentioned above, another important advantage herein is that the boiler provides for unrestricted start-up of the plant gas turbine.

Although the embodiment described herein includes a steam generator with vertical or horizontal tubes, the tubes also could be oriented at an angle, and various other modifications also may be made without departing from the spirit of the invention as defined by the claims. While the embodiment described herein uses water as the working fluid and therefore is generating steam, it is understood that a different working fluid could be used, in which case there would be liquid and vapor phases of that working fluid in the system in the place of the water and steam described here.

DESCRIPTION OF THE PREFERRED EMBODIMENTS

Figure 1A:
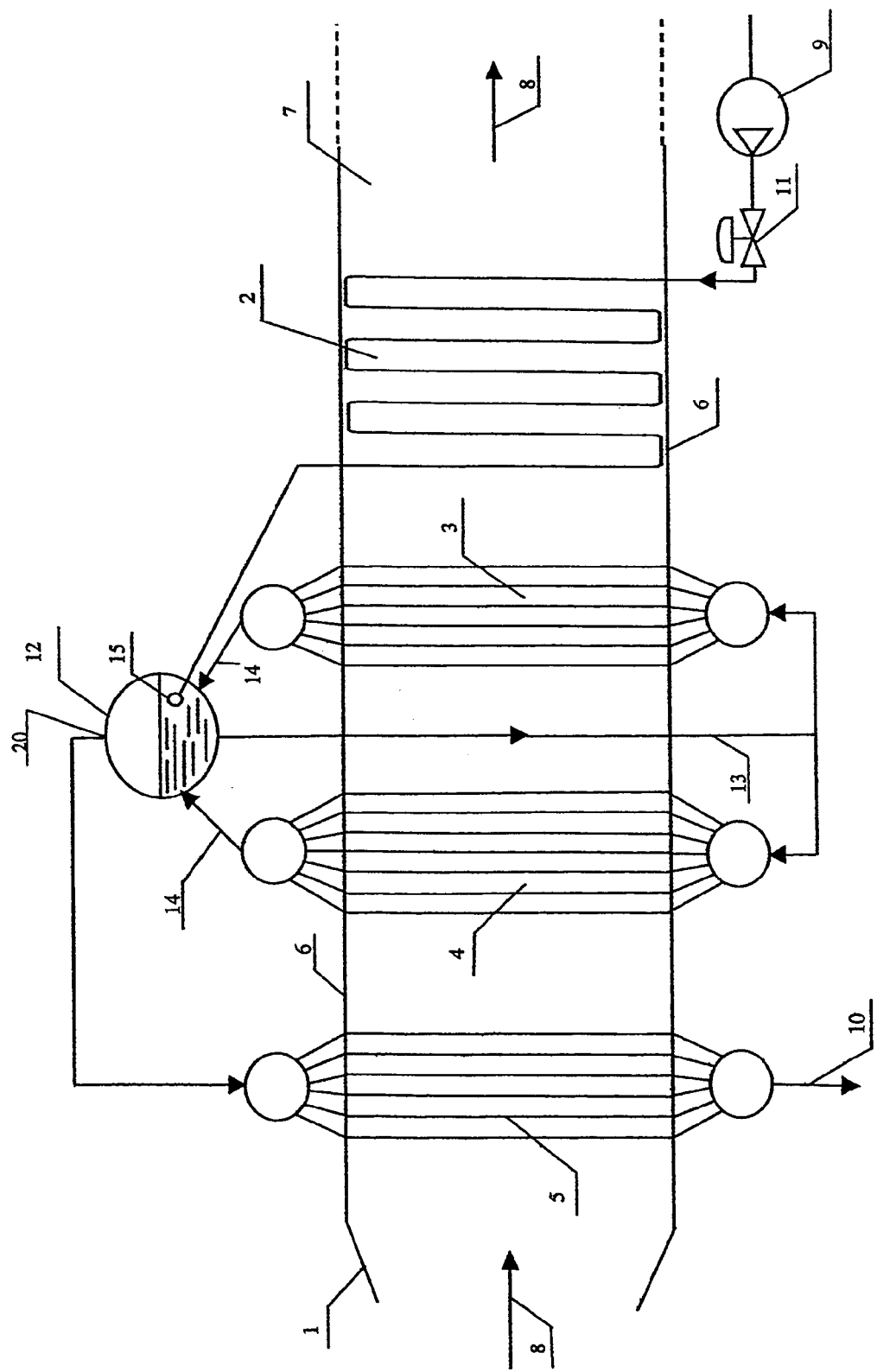
FIG. 1A is a schematic diagram showing a prior art drum-type steam generator relying on natural circulation.

FIG. 1A shows a typical steam generator 1, employing natural circulation. For example, this may be a heat recovery steam generator, disposed downstream of a gas turbine. The components of this system are of conventional or otherwise familiar construction.

The steam generator 1 includes the economizer 2, the evaporator with a number of parallel sections 3, 4 generating steam, and the superheater 5. Each evaporator section 3, 4 operates at the same outlet pressure and is made up of a plurality of tubes arranged in parallel. The steam generator 1 has enclosing walls 6, which form a heating gas duct 7 through which the heating gas (from the gas turbine) flows in the direction indicated by arrows 8. The controlled water supply to the boiler economizer 2 is provided by a feed pump 9 in the amount equal to the live steam flow at the outlet 10 of the superheater 5. (Blowdown and leakages are assumed equal to zero). Feed water flows from the feedwater pump 9, through the control valve 11, and through the drum water inlet 15 into the drum 12. The control valve 11 maintains the water level in the steam drum 12 at all operating loads. The heated water from the steam drum 12 is transported by natural circulation through the downcomer (s) 13 into the heated tubes of the evaporator sections 3 and 4, where the water heats up to the saturation temperature, evaporates, and goes back to the drum 12 through risers 14 in the form of a steam water mixture. After separating from the boiling water in the drum 12, the saturated steam is transported out of the steam drum 12 through the drum steam outlet 20, to the superheater 5, downstream of which the superheated steam can be used in the steam turbine (not shown) or process. Due to the mechanism of natural circulation, the flow through the downcomer(s) 13 and through the evaporator sections 3 and 4 is much greater than that from the feed pump 9 (up to 4-5 times and more). The large size of the downcomer(s) increases the boiler cost.

At high subcritical pressure, the weight of the steam drum for heavy duty steam generators of utility plants may be well above 100 tons, with the drum shell thickness over 150 mm. Such a drum is not only very expensive, but, as noted above, it also significantly reduces the cyclic capacity of the boiler and power plant as a whole due to operationally imposed thermal and mechanical stresses. Another disadvantage of this steam generator 1 at high subcritical pressure, as is known to those skilled in the art, is the difficulty in providing reliable natural circulation in evaporator sections 3, 4 at all operating loads. Special design approaches are needed for this purpose.

Figure 1B:
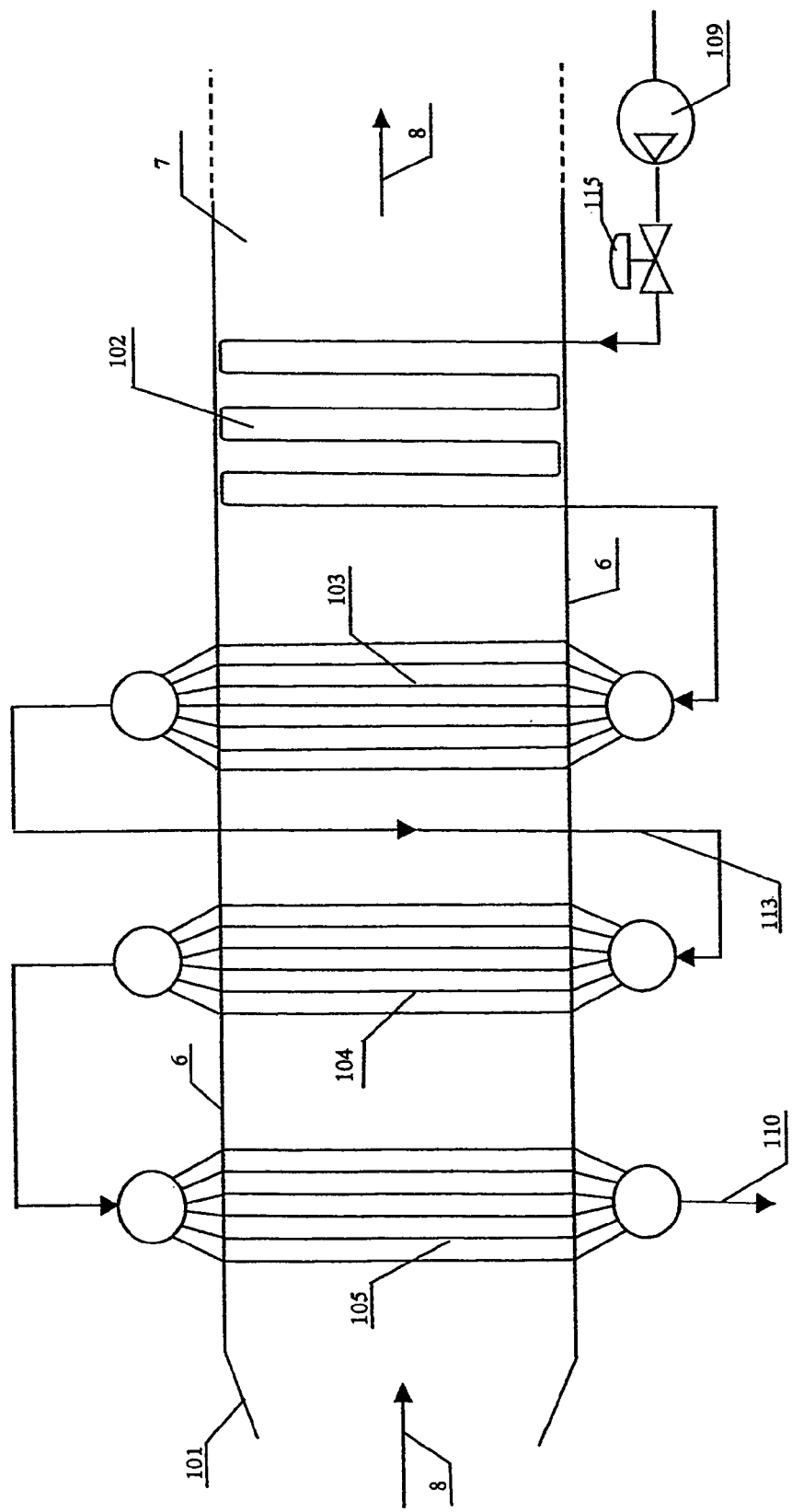
FIG. 1B is a schematic diagram showing a prior art drumless steam generator with vertical heated tubes relying on once-through circulation, as described in U.S. Pat. No. 6,189,491 B1.

Another prior art steam generator 101, is depicted in FIG. 1B. This boiler 101 utilizes the concept of once-through circulation and does not have a steam drum. As a result, there is no concern about power plant cyclic capacity limits due to the heating and cooling of a thick-walled steam drum. As in the previous embodiment, enclosing walls 6 define a heating gas duct 7, and hot gas flows through the duct 7 in the direction shown by the arrows 8 to heat the working fluid (water/steam) in the boiler. There is an economizer 102, and there are evaporator once-through heated sections 103 and 104, and a superheater 105. In this case, the steam generating tubes of the second once-through evaporator section 104 are fluidically (with respect to the working fluid) disposed downstream of the steam generating tubes of the first once-through evaporator section 103, via a downcomer (s) system 113. (The second once-through evaporator section 104 is disposed upstream of the first once-through evaporator section 103 with respect to the hot gas that is flowing through the duct 7, so it is exposed to hotter gas than the first once-through evaporator section 103.) Unlike the downcomer 13 in FIG. 1A, with subcooled water flow, there is always a downward steam/water mixture flow through the pipes of system 113 in FIG. 1B. This mixture should be properly distributed between the parallel heated tubes of the second once-through section 104 of the evaporator. The water supply from the feed pump 109 to the steam generator 101 is controlled by a valve 115 to attain the desired steam temperature at the outlet 110 of the superheater 105. At steady state conditions, the flow through each of the boiler consecutive heating surfaces 102, 103, 104, and 105, enclosed in duct 6, is constant and equal to the water supply from the pump 109 (working fluid leakages are assumed equal to zero). The phase change from water to saturated steam occurs downstream of the economizer 102, in the first evaporator once-through section 103 with upward flow direction. There is practically no change in the mass steam content in the unheated downcomer system 113. The final phase change from saturated steam to superheated steam occurs in the second evaporator once-through section 104 with upward flow direction. The flow of water and steam in all boiler heating surfaces occurs in efficient counterflow relationship to the direction 8 of the heating gas.

As stated in the background section of the application, consideration should be given to the following circumstances associated with the practical employment of the once-through boiler depicted in the FIG. 1B:

Increase in evaporator heating surface area (in comparison to that of the evaporator with natural circulation as shown in FIG. 1A);

The need for a special system to transport and distribute the steam/water mixture in-between the evaporator once-through sections;

Special devices to provide for the stable flows in evaporator tubes and pipes;

Special equipment for boiler start-up and transient load conditions (i.e. a separator, storage vessel, piping, valves, instrumentation, etc.).

Figure 2:
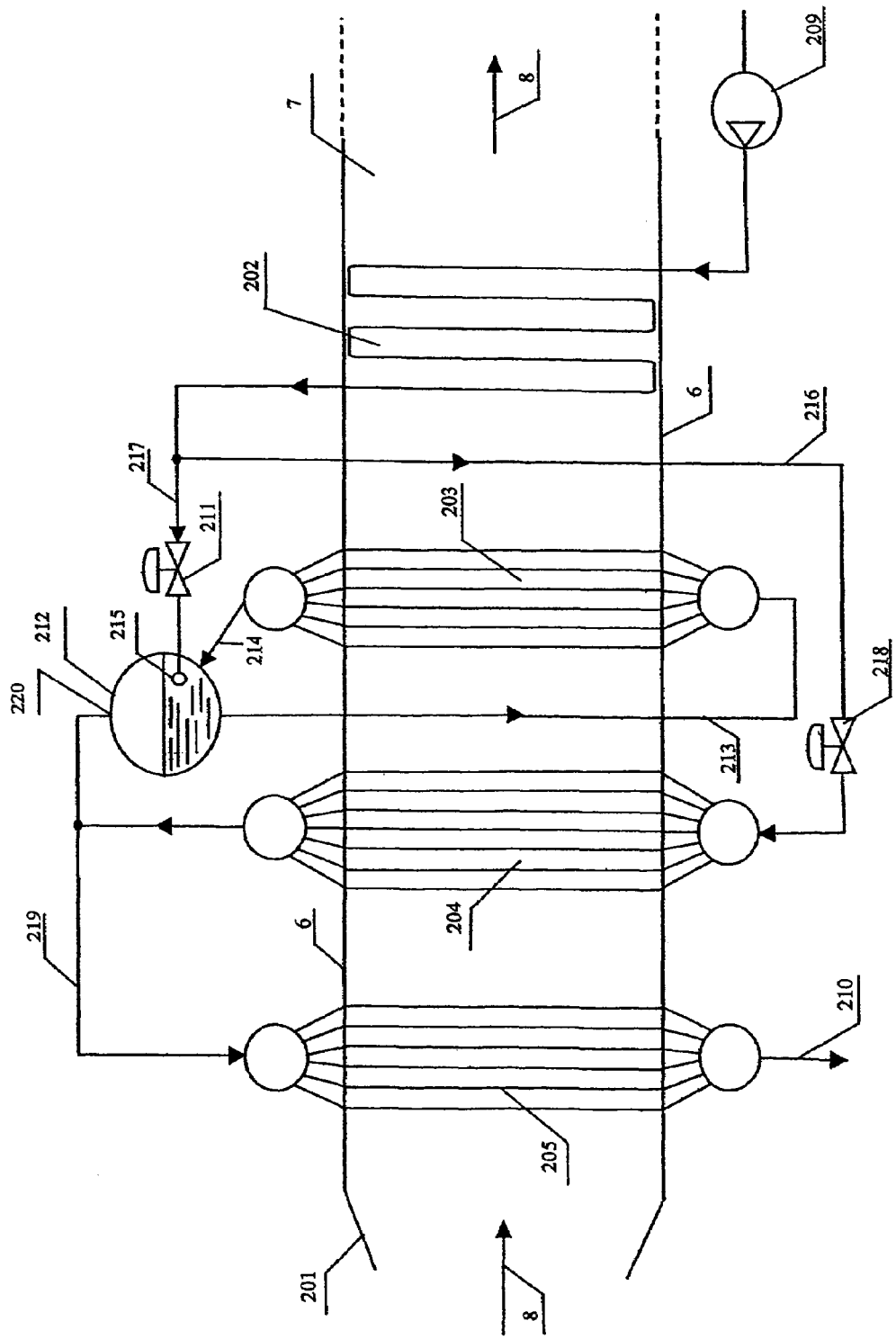
FIG. 2 is a schematic diagram showing a drum-type steam generator with vertical heated tubes, relying both on once-through and on natural circulation, made in accordance with the present invention.

FIG. 2 shows an embodiment of the present invention. This steam generator 201 includes the heating surfaces of an economizer 202, evaporator sections 203, and 204, and superheater 205 located inside the duct 7 with enclosing walls 6. There also is a feed pump 209, and a steam separating drum 212.

One of the main differences between this system and the prior art boilers of FIGS. 1A and 1B is that, in this system, the evaporator includes at least one evaporator section 203 that relies on natural circulation and another evaporator section 204 that is a once-through section. Both of these sections 203, 204 have the same outlet pressure. The natural circulation section 203 includes a steam separating drum 212, risers 214, and a downcomer 213. The inlets of the natural circulation section 203 and of the once-through section 204 are connected in parallel to the common outlet of the economizer 202 via the water lines 216 and 217. The outlet from the economizer splits into the water lines 216, 217, each of which has its own control valve to control the amount of water that flows through it. A first control valve 211 is in the line 217, between the pump 209 and the drum water inlet 215, and a second control valve 218 is in the line 216, between the pump 209 and the inlet to the once-through evaporator section 204. The outlets of the evaporator sections 203 and 204 also are connected in parallel to the common inlet steam line 219 of the superheater 205, with both evaporator sections 203, 204 having the same outlet pressure.

The water from the feed pump 209 goes through the economizer 202, and, at the outlet of the economizer, it branches off in two directions. One branch passes through the first control valve 211 into the drum water inlet 215 of the steam drum 212, and the other branch passes through the second control valve 218 into the inlet of the once-through evaporator section 204. The immediate water supply from the steam drum 212 to the heated tubes of the natural circulation evaporator section 203 is provided through downcomer(s) 213. The steam generated in the natural circulation evaporator section 203 is transported through risers 214 to the steam drum 212, where it is separated from the boiling water and then passes through the drum steam outlet 220 to the inlet steam line 219 of the superheater 205. The once-through evaporator section 204 generates a slightly superheated steam (degree of superheat about 10-30 deg C.) that also goes to the common inlet steam line 219 of the superheater 205.

As is evident from FIG. 2, the total steam production of the steam generator 201 is equal to the sum of two components: the steam flow generated in the pump assisted once-through section 204 and the steam flow generated in the natural circulation section 203. Control valves 211 and 218 are adjusted by a control system to provide an appropriate distribution of water flows between the evaporator sections 203 and 204, depending upon the water level in the steam drum 212 and the steam temperature in the inlet steam line 219 to the superheater 205 (or the steam temperature in the outlet steam line 210 from the superheater 205 or the steam temperature at some other point downstream of the evaporator).

Unlike the once-through boiler depicted in FIG. 1B, the phase change from water to saturated steam and then from saturated steam to superheated steam occurs in a single pass of the once-through evaporator section 204 with upward direction of working fluid. The distance needed to effectuate this transformation is at least three times shorter than that in the once-through boiler of the prior art. The shorter distance gives another important operating advantage to this boiler: the superheated steam temperature response lag to any change in the position of the control valve 218 or, in other words, to a proper change in feedwater supply to the once-through evaporator section 204, is significantly lower than in the once-through boiler 101. The shortened response lag simplifies the control of the outlet steam temperature by changing the water supply to the once-through evaporator section 204, without the need for an inter-stage attemperator in the boiler superheater 205.

Moreover, employment of upward flow with low working fluid velocities in the tubes of the once-through evaporator section 204 activates the geodetic head as a governing factor in flow distribution between the parallel tubes of that section 204. This practically eliminates intertube flow variations in the once-through section 204, thereby resulting in stable tube metal temperature conditions at any boiler operating load. No additional throttle/choke devices are needed for this purpose.

As mentioned above, the once-through evaporator section 204 of this boiler 201, unlike the once-through prior art boiler 101 depicted in FIG. 1B, does not employ a downward steam/water mixture flow and multiple passes of working fluid. Hence, there is no need for any special means to distribute the steam/water mixture, which significantly simplifies the boiler structure, making it more reliable and less expensive. The single pass once-through section 204 also contributes to the reduction of steam/water mixture pressure loss and thus reduces the feed pump power consumption.

Additionally, the natural circulation evaporator section 203 is located in the boiler duct 7 downstream with respect to the hot gas flow 8 from the once-through section 204, in an area where the heating gas temperature is lower. Due to the lower heating gas temperature, the heat transfer in the heating surfaces of the natural circulation evaporator section 203 is not as effective as in the heating surface of the once-through section 204, which is located in the duct area with higher heating gas temperature. That is why, despite the relatively large heating surface (sometimes up to 25-30% of the total evaporator surface), the natural circulation evaporator section 203 of this boiler is able to generate only a small fraction, sometimes only 5-8%, of the total boiler steam production. Other conditions being equal, the low steam production of the natural circulation evaporator section 203 permits a smaller size, shell thickness, and weight of the steam drum 212 as compared with the steam drum 12 in the boiler 1 of FIG. 1A. Steam production is also an important factor in determining the size, weight, and flow area of the evaporator downcomer system, again permitting the downcomer system 213 of this boiler 201 to be smaller than that of the downcomer 13 in the boiler 1. The table below shows the salient features of one example of an evaporator drum and downcomer(s) for the prior art boiler 1 depicted in the FIG. 1A as compared with an evaporator drum and downcomer(s) for the natural circulation evaporator section 203 of the boiler 201 shown in FIG. 2, with both boilers being designed for the same input conditions, including steam production, hot gas temperature, hot gas flow rate, and so forth.

|  | FIG. 1A | FIG. 2 |
|---|---|---|
| Evaporator Section No. | 3 & 4 | 203 |
| Steam Pressure, bara | 186 | 186 |
| Section Surface Area, % of total evaporator | 100 | 25.4 |
| Section Steam Production, % of total evaporator | 100 | 5.7 |
| Steam Drums: |  |  |
| Inside Diameter, mm | 1830 | 915 |
| Shell Length, m | 13.1 | 6.1 |
| Shell Thickness, mm | 156 | 79 |
| Retention Time, min | 3.0 | 3.2 |
| Weight | X | 0.119X |
| Downcomers: |  |  |
| Outside Diameter, mm | 457 | 168 |
| Number of Pipes | 2 | 1 |
| Wall Thickness, mm | 44 | 18 |
| Water Velocity, m/s | 2.7 | 2.9 |
| Weight | Y | 0.075Y |

As shown in the table, it is possible to achieve a significant reduction in size and weight of the steam drum and downcomer(s), which translates into reduction in boiler cost. Another important advantage here is the reduction in thermal and mechanical stresses operationally induced in these thick-walled components (particularly in the drum) during transient conditions, up to the level providing for the boiler and plant cyclic capacity needed. The stress reduction results not only from the reduced thickness of the drum shell but also from slower heat rate supply to the heated tubes of the natural flow section 203, due to its location in the lower temperature heating gas area. Because of the stress reduction during start-up, this hybrid boiler 201, for example, does not require the hold-up time normally used for drum metal relaxation. This may eliminate the time-related restrictions to the gas turbine start-up and reduce the plant start-up cost.

At the same time, this hybrid boiler 201, in comparison to the once-through boiler 101 depicted in FIG. 1B, has accumulated water in the drum and an increased amount of boiling water in the heated tubes of its natural circulation evaporator section 203, which makes the operation of this hybrid boiler 201 more stable and precludes the variations of feedwater flow. This important feature increases boiler reliability.

Another important advantage of the hybrid steam generator 201 is its simple start-up procedure, very similar to that utilized in the natural circulation boiler 1 depicted in FIG. 1A. Prior to the start-up of this hybrid boiler 201, its natural circulation evaporator section 203 should be filled with feedwater up to the start-up level in the steam drum 212. What simplifies the start-up of this hybrid boiler 201 and makes it similar to that of the conventional boiler 1 with natural circulation is its use of a single pass once-through evaporator section 204. As mentioned above, this section 204 utilizes only upward flow of the working fluid and employs no system for steam/water mixture distribution. A sufficient amount of water can be put into the parallel tubes of this section 204 prior to the boiler start-up. The continuous feedwater supply to the once-through section 204 can be originated from the feed pump 209, through the economizer 202, the line 216, and the control valve 218, as soon as a certain steam flow is established through the superheater 205 after the gas turbine light-off.

During the start-up, as the gas turbine load and boiler pressure increase, the water supply to the once-through section 204 is also increased. The control valve 218 takes care of this process by controlling the appropriate degree of superheat in the inlet steam line 219 to the superheater 205 or by controlling the temperature at the superheater outlet 210. Simultaneous water supply to the natural circulation section 203 is provided as needed via the parallel line 217 and control valve 211. After start-up, the independent water supply to the parallel evaporator sections 203 and 204 continues for normal boiler operation. The valves 211 and 218 in lines 217 and 216 control this process on a continuous basis, with the first control valve 211 being adjusted to maintain the water level in the drum 212 and the second control valve 218 being adjusted to maintain the temperature of steam in the line 219 or at the outlet 210. Reliable operation of this hybrid boiler 201 can be provided without requiring a separator in-between the once-through evaporator 204 and the superheater 205.

The embodiment described herein is intended to be used only in an illustrative manner, as one example of a boiler made in accordance with the present invention. In this regard, it is evident that those skilled in the art, once given the benefit of this disclosure, may make modifications to the specific embodiment described herein without departing from the spirit and scope of the present invention as defined in the claims.

What is claimed is:

1. A steam generator, comprising:
   a steam separating drum having a drum water inlet and a drum steam outlet, said drum steam outlet operating at a first pressure;
   at least one evaporator including at least two evaporator sections, each of said evaporator sections including a plurality of heat-absorbing steam generating tubes connected in parallel;
   at least one of said evaporator sections comprising a natural circulation section, which receives water from said drum and outputs a steam water mixture into said drum;
   at least another of said evaporator sections comprising a once-through section, having an evaporator inlet and an evaporator outlet that outputs steam at said first pressure;
   a feedwater pump having an outlet that splits into at least a first feed line which feeds the drum and at least a second feed line which feeds the once-through evaporator section; and
   a control system including at least two feedwater control valves, one of said feedwater control valves in said first feed line, controlling the flow of water from said feedwater pump to said drum water inlet, and the other of said feedwater control valves in said second feed line, independently controlling the flow of water from said feedwater pump to said evaporator inlet for said once-through section.

2. A steam generator as recited in claim 1, and further comprising an economizer, wherein water flows from said feedwater pump through said economizer, and then splits into said first and second feed lines.

3. A steam generator as recited in claim 2, and further comprising a superheater, which receives steam from said natural circulation section and from said once-through evaporator section.

4. A steam generator as recited in claim 3, wherein said evaporator sections are arranged for a working fluid to move through their respective tubes in a predominantly upward direction.

5. A steam generator as recited in claim 1, wherein said control system includes means for controlling the water level in said drum by adjusting said one feedwater control valve and means for controlling the temperature of superheated steam downstream of said evaporator sections by adjusting said other feedwater control valve.

6. A steam generator as recited in claim 1, and further comprising a steam line that receives steam both from said once-through evaporator section and from said natural circulation section.

7. A steam generator as recited in claim 6, and further comprising a superheater that receives steam from said steam line.

8. A method of steam generation, comprising the steps of:
providing an evaporator including at least two parallel steam generating sections, each including a plurality of heat-absorbing evaporator tubes connected in parallel, one of said sections being a natural circulation section including a steam separating drum, and another of said sections being a once-through section;
pumping feedwater in parallel flow to said drum and to said once-through section;
combining the steam outputs from said natural circulation section and from said once-through section into a common steam supply line; and
controlling the water level in said drum and the superheated steam temperature downstream of said evaporator sections by controlling the parallel feedwater flows to said drum and to said once-through section, respectively.

9. A method of steam generation as recited in claim 8, wherein said evaporator is located within a hot gas duct, in which hot gas is flowing from an upsteam direction at a high temperature to a downstream direction at a lower temperature, and wherein said natural circulation section is located in a lower temperature portion of said duct than said once-through section.

10. A hybrid vapor generator, comprising:
a hot gas duct;
an evaporator operating at a single outlet pressure, said evaporator including a plurality of evaporator sections, at least one of said evaporator sections being a natural circulation section, including a separating drum, a downcomer, a plurality of natural circulation heat absorbing evaporator tubes located inside said hot gas duct and connected together in parallel, and a riser; and at least another of said evaporator sections being a pump assisted circulation section including a plurality of pump assisted circulation heat absorbing evaporator tubes connected together in parallel; and
a pump, which pumps working fluid into said pump assisted circulation evaporator section through at least a first inlet line; wherein said pump assisted circulation evaporator section is a once-through evaporator section, and said drum is fed through at least a second inlet line which is connected in parallel with said first inlet line.

11. A hybrid vapor generator as recited in claim 10, and further comprising a hot gas source, which supplies hot gas to said hot gas duct.

12. A hybrid vapor generator as recited in claim 11, wherein said hot gas flows within said duct from an upstream direction at a higher temperature to a downstream direction at a lower temperature, and wherein said natural circulation evaporator section is located in a lower temperature portion of said duct than said once-through evaporator section.

13. A hybrid vapor generator as recited in claim 12, and further comprising an economizer and a superheater located in said hot gas duct, said economizer receiving liquid from said pump and being located in a lower temperature portion of said duct than said natural circulation evaporator section, and said superheater receiving vapor from said evaporator sections and being located in a higher temperature portion of said duct than said once-through evaporator section.

14. A hybrid vapor generator as recited in claim 11, and further comprising at least one valve between said pump and said once-through evaporator section and another valve between said pump and said separating drum.

15. A hybrid vapor generator as recited in claim 14, and further comprising a hot gas source supplying hot gas to said hot gas duct.

16. A hybrid vapor generator as recited in claim 15, wherein said hot gas source includes a gas turbine power generating unit.

17. A hybrid vapor generator as recited in claim 16, wherein said working fluid is water, and further comprising a superheater which receives steam from said evaporator, and a steam turbine power generating unit which receives steam from said superheater.

18. A hybrid vapor generator as recited in claim 10, and further comprising an economizer and a superheater located in said hot gas duct, said economizer receiving liquid from said pump, and said superheater receiving vapor from said evaporator sections.

* * * * *